(12) United States Patent
Churchfield

(10) Patent No.: US 6,748,999 B2
(45) Date of Patent: Jun. 15, 2004

(54) WINDOW BLIND

(75) Inventor: Vincent Churchfield, Radevormwald (DE)

(73) Assignee: Happich Fahrzeug-und Industrietile GmbH (DE)

( * ) Notice: Subject to any disclaimer, the term of this patent is extended or adjusted under 35 U.S.C. 154(b) by 0 days.

(21) Appl. No.: 10/000,964

(22) Filed: Oct. 24, 2001

(65) Prior Publication Data

US 2002/0050327 A1 May 2, 2002

(30) Foreign Application Priority Data

Oct. 24, 2000 (DE) .......................... 100 52 560
Jan. 13, 2001 (DE) .......................... 101 01 436

(51) Int. Cl.$^7$ .............................................. E05F 15/00
(52) U.S. Cl. ...................................... 160/288; 160/285
(58) Field of Search ................................ 160/288, 286, 160/285, 280, 281, 289, 275, 276, 282, 283

(56) References Cited

U.S. PATENT DOCUMENTS 1,901,535 A * 3/1933 Saa .............................. 160/288
2,553,279 A * 5/1951 Rolston ....................... 160/288

* cited by examiner

*Primary Examiner*—David Purot
(74) *Attorney, Agent, or Firm*—Ostrolenk, Faber, Gerb & Soffen, LLP

(57) ABSTRACT

A window blind, with a winding shaft having a rolling-up device, a blind web rolled up on the winding shaft, a pull bar, to which the free end of the blind web is fastened, a guide arrangement, on which the end regions of the pull bar are arranged longitudinally displaceably perpendicularly to the pull bar axis, and a braking arrangement which is arranged inside the pull bar and acts releasably on the guide arrangement in order to fix the pull bar in any positions on the guide arrangement.

21 Claims, 11 Drawing Sheets

WINDOW BLIND

BACKGROUND OF THE INVENTION

The invention relates to a window blind with a winding shaft having a rolling-up device, a blind web rolled up on the winding shaft, and a pull bar, to which the free end of the blind web is fastened.

Window blinds of the type referred to, which serve as protection against the sun, particularly in vehicles, are generally designed as roller blinds and are correspondingly costly. Even more costly are electric motor-operated window blinds which also belong to the state of the art.

SUMMARY OF THE INVENTION

The object of the invention is to provide a window blind, in which the blind web can be drawn off the winding shaft and transferred into the sun protection position desired in a simple manner and locked, in particular a cost-effective design being sought.

Accordingly, the subject of the invention is a window blind with a winding shaft having a rolling-up device, a blind web rolled up on the winding shaft, a pull bar, to which the free end of the blind web is fastened, a guide device, on which the end regions of the pull bar are arranged longitudinally displaceably perpendicularly to the pull bar axis, and a braking arrangement which is arranged inside the pull bar and acts releasably on the guide arrangement in order to fix the pull bar in any positions on the guide arrangement. In this connection, the guide device preferably comprises two hollow profile strips which flank the blind web at its longitudinal edges and are each provided with a longitudinal slot on their mutually facing sides. However, rods, for example made of round material, can also be used instead of hollow profile strips. It is of great importance that closing bodies be inserted into the free ends of the pull bar. These engage in one of the longitudinal slots. Each slot has an opening with a brake block inserted in it, which is loaded by a compression spring. The brake blocks are arranged such that they can, via an adjustable connecting means, be moved toward one another counter to the force of the compression spring for canceling the braking action. As a rule, the brake blocks are located in pressing contact against the inner wall of the hollow profile strips, and this pressing contact is interrupted temporarily only for adjusting the blind web position.

Especially advantageously, the adjustable connecting means comprises a tautly guided wire cable which is fastened to the brake blocks and is supported by supports arranged at a spacing from one another. An actuating means acts on the wire cable arranged between the supports, and when that means is operated, it shortens the active length of the wire cable and draws the brake blocks toward one another. In this connection, the actuating means preferably comprises a manually operable lever which is articulated on the pull bar and supported on the wire cable by a working surface designed as an eccentric path.

In a development of the invention, the pull bar has a handle with a handle opening, in which the lever serving as the actuating means is arranged.

The invention also concerns a window blind with a winding shaft having a rolling-up arrangement, a blind web rolled up on the winding shaft, a pull bar, to which the free end of the blind web is fastened and a guide arrangement, on which the end regions of the pull bar are arranged longitudinally displaceably perpendicularly to the pull bar axis. The guide arrangement comprises two racks flanking the blind web at its longitudinal edges and two toothed wheels which mesh with the racks, and which are arranged in the end regions of the pull bar. At least one braking arrangement fixes the pull bar in any positions on the guide arrangement. The at least one braking device can act on one of the toothed wheels or a bearing shaft bearing a toothed wheel.

According to a preferred embodiment, the pull bar is provided in each end region with a bearing housing in each case surrounding a rack. Each bearing housing bears a toothed wheel arranged in a rotationally fixed manner on a bearing shaft. At least one of the bearing shafts is, for braking the restoring movement of the rolling-up arrangement, equipped with a friction brake which consists of a shaped body made of wear-resistant, viscoplastic synthetic material which is arranged in the bearing housing in a rotationally fixed manner in relation to the bearing shaft. The body has a bore for receiving an axial region of the bearing shaft. The diameter of the bore is smaller than the diameter of the bearing shaft, but sufficient to permit relative movement between the shaped body and the bearing shaft.

According to another preferred embodiment, a brake block loaded in each case by a compression spring in each case acts on untoothed circumferential regions of the toothed wheels. The arrangement of the brake blocks is effected in such a manner that they can, via an adjustable connecting means, be moved toward one another counter to the force of the compression spring, while canceling the braking action. The adjustable connecting means comprises a tautly guided wire cable which is fastened to the brake blocks and is supported by supports arranged at a spacing from one another. An actuating means acts on the wire cable arranged between the supports in order, when it is operated, to shorten the active length of the wire cable and to draw the brake blocks toward one another.

It is especially advantageous if the adjustable connecting means comprises a tautly guided wire cable which is fastened to the brake blocks and is supported by supports arranged at a spacing from one another. An actuating means acts on the wire cable arranged between the supports so that when it is operated, it shortens the active length of the wire cable and draws the brake blocks toward one another. The actuating means preferably comprises a manually operable lever which is articulated on the pull bar and supported on the wire cable by a working surface designed as an eccentric path. In this connection, the pull bar has a handle with a handle opening, in which the lever serving as actuating means is arranged.

According to a further preferred embodiment of the invention, at least one of the toothed wheels has, in addition to the toothing meshing with the rack, an external toothing. A braking body under the influence of a compression spring can be engaged in the tooth spaces. By means of a manually operable slide, the braking body disengaged again counter to the force of the compression spring.

In order to compensate possible dimensional differences of the spacing between the racks and the bearing housings, it is advantageous that at least one of the bearing housings is loaded outwardly, that is to say in the direction of a rack, by a compression spring.

BRIEF DESCRIPTION OF THE DRAWINGS

Illustrative embodiment of the invention is explained in greater detail below by means of the drawings, in which.

DESCRIPTION OF PREFERRED EMBODIMENTS

Figure 1:
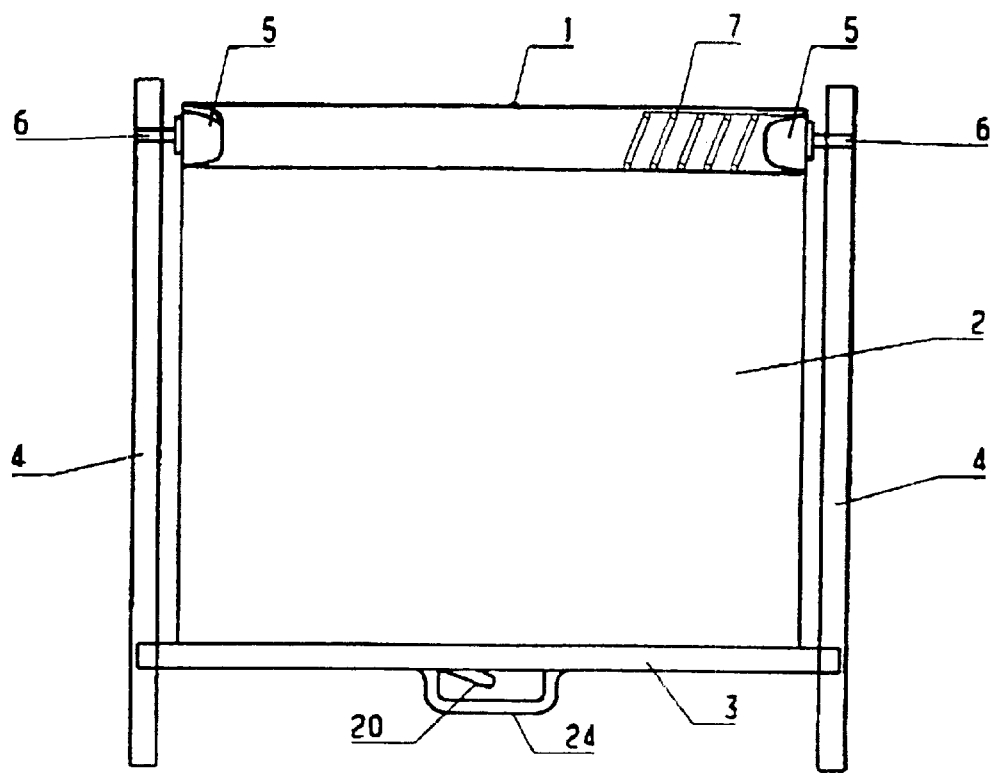
FIG. 1 shows a view of a complete window blind.

The novel window blind according to FIGS. 1–8 comprises a winding shaft 1, a blind web 2 arranged so as to be capable of being rolled up on and unrolled from the shaft, a pull bar 3, to which the free end of the blind web 2 is fastened, and a guide arrangement formed from two hollow profile strips 4 flanking the blind web 2 at the longitudinal edges.

The winding shaft 1 suitably comprises a tube with closing elements 5 at the ends, pivots 6 and, arranged in its interior, a rolling-up device with a spring 7 indicated in only a dot/dash manner.

Figures 3, 4, 5, 6:
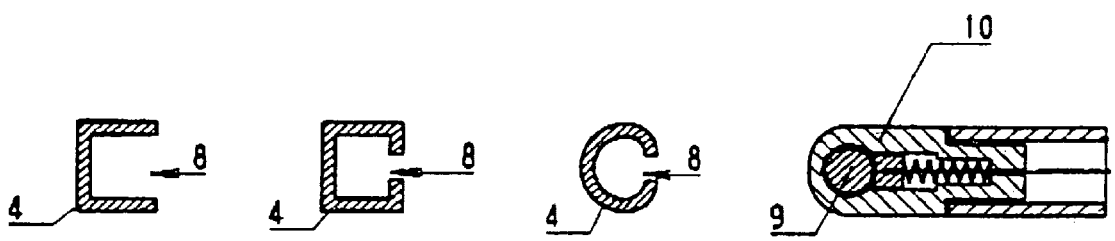
FIGS. 3–8 show embodiments and details of a guide arrangement of the window blind according to FIGS. 1 and 2.

On their mutually facing sides, the hollow profile strips 4 each have a longitudinal slot 8 which, as shown in FIGS. 3 to 5, can be of very different design. The hollow profile strips 4 can thus be in the form of a U-shaped profile according to FIG. 3, a slotted box profile according to FIG. 4 or a slotted tubular profile according to FIG. 5. FIG. 6 shows another variant, a solid round profile 9 forming the guide arrangement.

Figure 2:
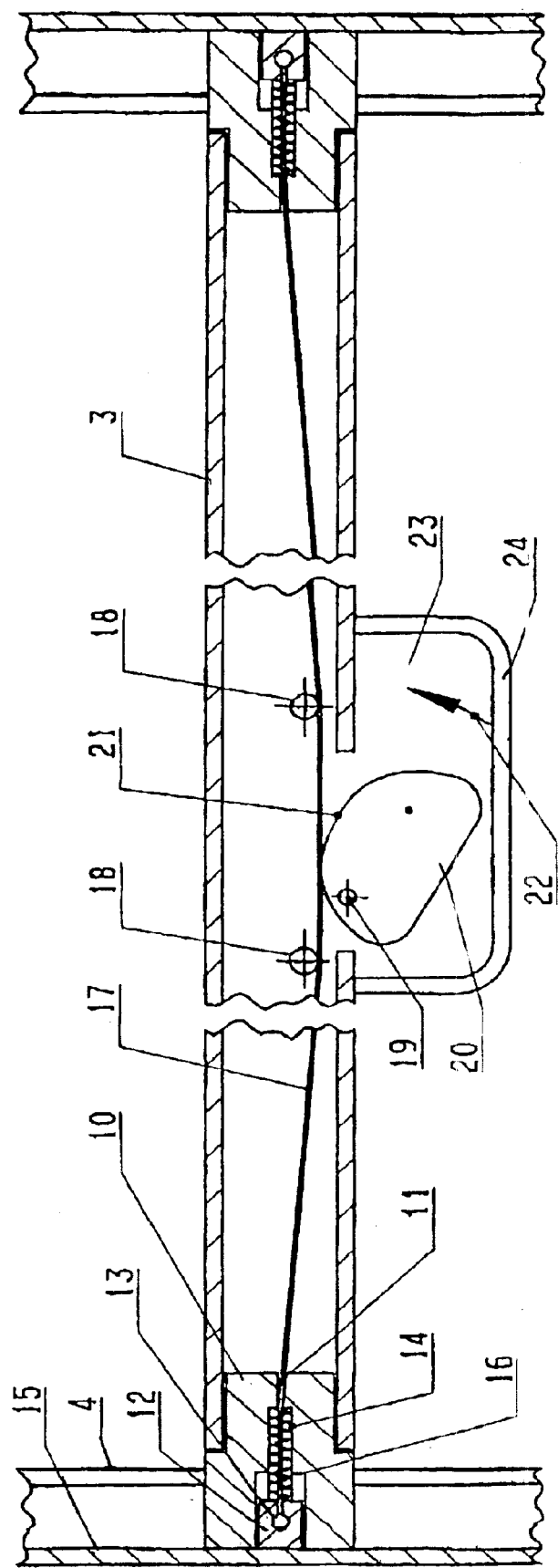
FIG. 2 shows a part region of the window blind in vertical section.

FIG. 2 shows a section through one of the hollow profile strips 4 and through the pull bar 3 which likewise consists of a hollow profile and is preferably in the form of a decorative profile strip. The right half, which is not shown in FIG. 2, is of mirror-inverted design relative to the left half, which is shown. A closing body 10, which has a stepped bore and a passage opening 11, is inserted into each end of the pull bar 3. The first step 12 of the stepped bore receives a brake block 13, and the second step 14 receives a compression spring 16 loading the brake block 13 against the inner wall 15 of the hollow profile strip 4. The brake blocks 13 loaded by the compression spring 16 hold the pull bar 3 along with the blind web 2 in any position on the hollow profile strips 4 of the guide arrangement. As seen in FIG. 2, adjustable connecting means enable the brake blocks 13 to be moved toward one another, counter to the force of the compression springs 16, while canceling the braking action. A preferably sheathed wire cable 17, which is guided through the passage openings 11 in the closing bodies 10, is fastened to the brake blocks 13 and runs tautly through the pull bar 3. It serves as the adjustable connecting means. Approximately at the central region, the wire cable 17 is supported by two supports 18 which may consist of pins and are spaced from one another.

Between the supports 18 is an actuating means for acting on the wire cable 17. That means comprises a lever 20 articulated on the pull bar 3 at 19. The working surface of the lever 20 on the wire cable 17 follows an eccentric path 21, so that the wire cable 17 is moved into the space between the supports 18 when the lever 20 is pivoted in the arrow direction 22. This shortens the extended wire cable length and moves the brake blocks 13 toward one another which pulls them away from the inner wall 15 of the hollow profile strips 4, temporarily interrupting their braking action. The lever 20 is suitably arranged in the handle opening 23 of a handle 24. The handle 24 can be grasped by a human hand. It is possible to operate or pivot the lever 20 using, for example, the thumb of the human hand. To roll up or unroll the blind web 2 in any position, the user holds the handle 24 and cancels the braking action of the brake blocks 13 by actuating the lever 20. After the lever 20 is released, it automatically pivots back into its starting position due to the tension in the wire cable. In FIG. 2, the starting position of the lever 20 and of the wire cable 17 is shown by solid lines, and the lever actuation position is illustrated by dot/dash lines.

FIG. 6 shows that the closing bodies 10 can also be designed for surrounding solid profiles, such as round bars, without departing from the principle of the invention.

Figure 7:
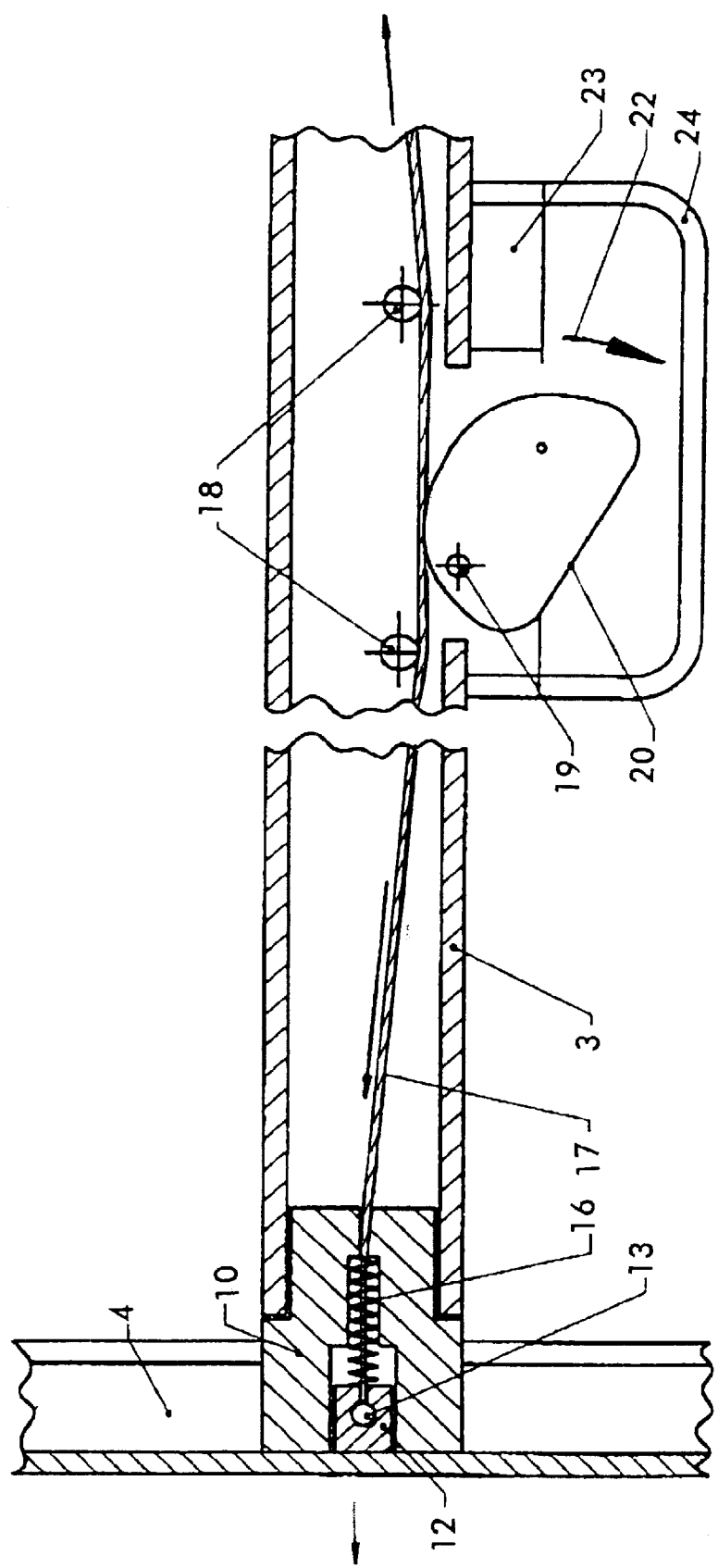
Figure 8:
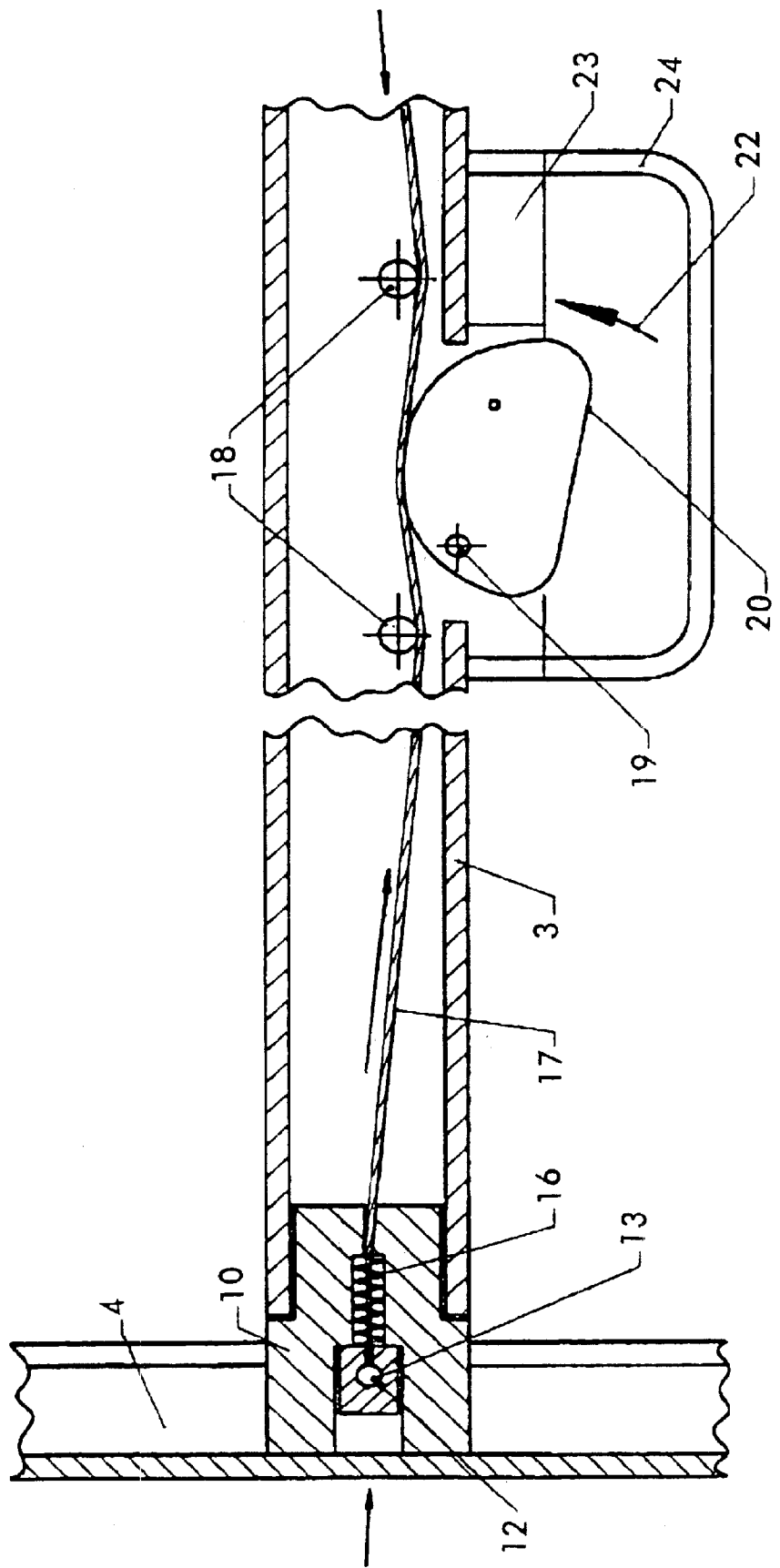
Figure 9:
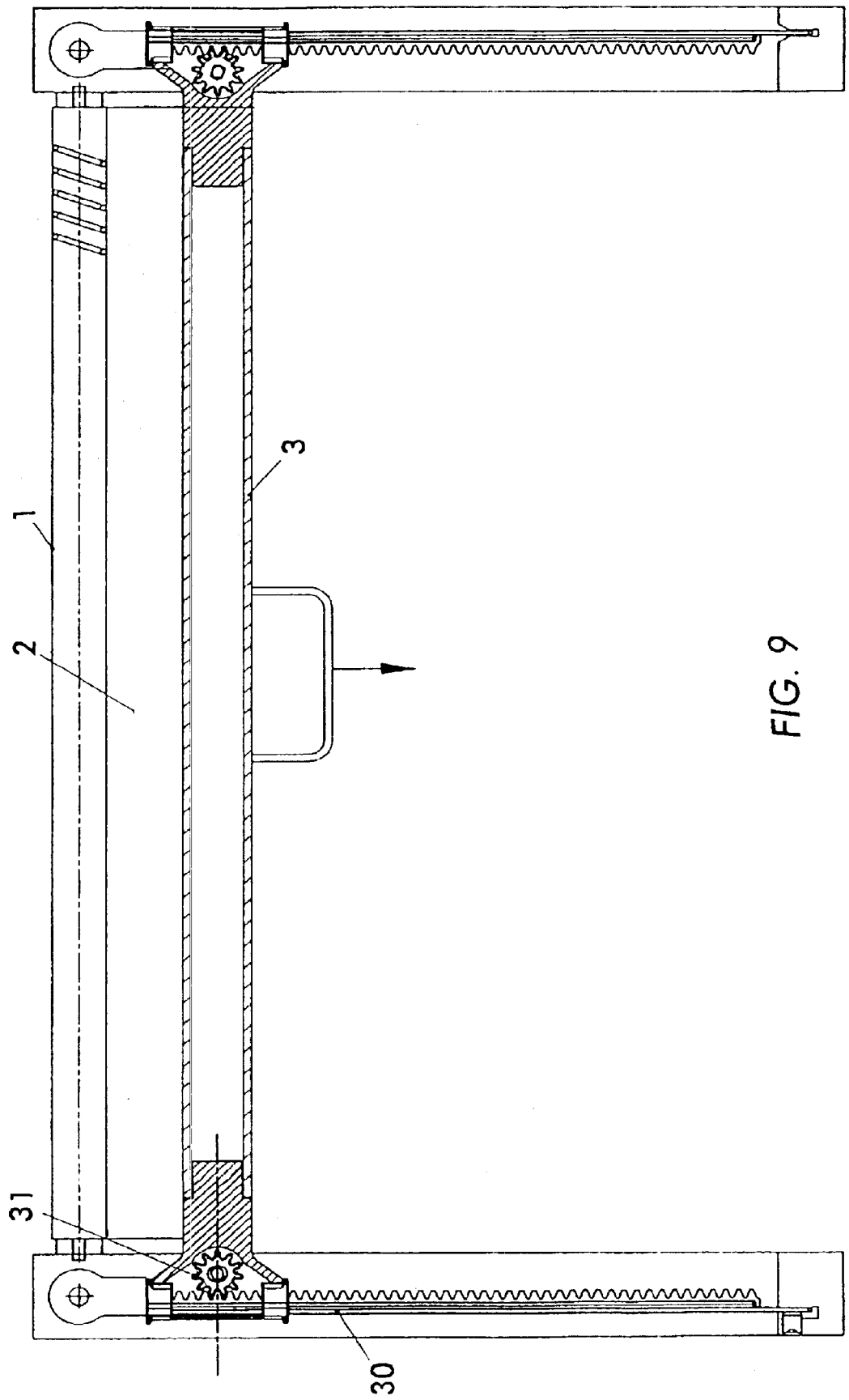
FIG. 9 shows a view of a second complete window blind.

For clarification, FIGS. 7 and 8, are on an enlarged relative to FIGS. 1 to 6. FIG. 7 shows the window blind with a braking system in the closed state, and FIG. 8 shows the window blind with a braking system in the open state.

In the window blinds shown in FIGS. 9 to 15, those parts corresponding to the window blinds according to FIGS. 1 to 8 are provided with the same reference numbers. The window blind of FIGS. 9 to 11 thus comprises a winding shaft 1, a blind web 2 arranged so as to be capable of being rolled up and unrolled thereon, a pull bar 3, to which the free end of the blind web 2 is fastened, and a guide arrangement which comprises two racks 30 flanking the blind web 2 at its longitudinal edges and two toothed wheels 31 which mesh with the racks and are arranged in the end regions of the pull bar 3.

Figure 10:
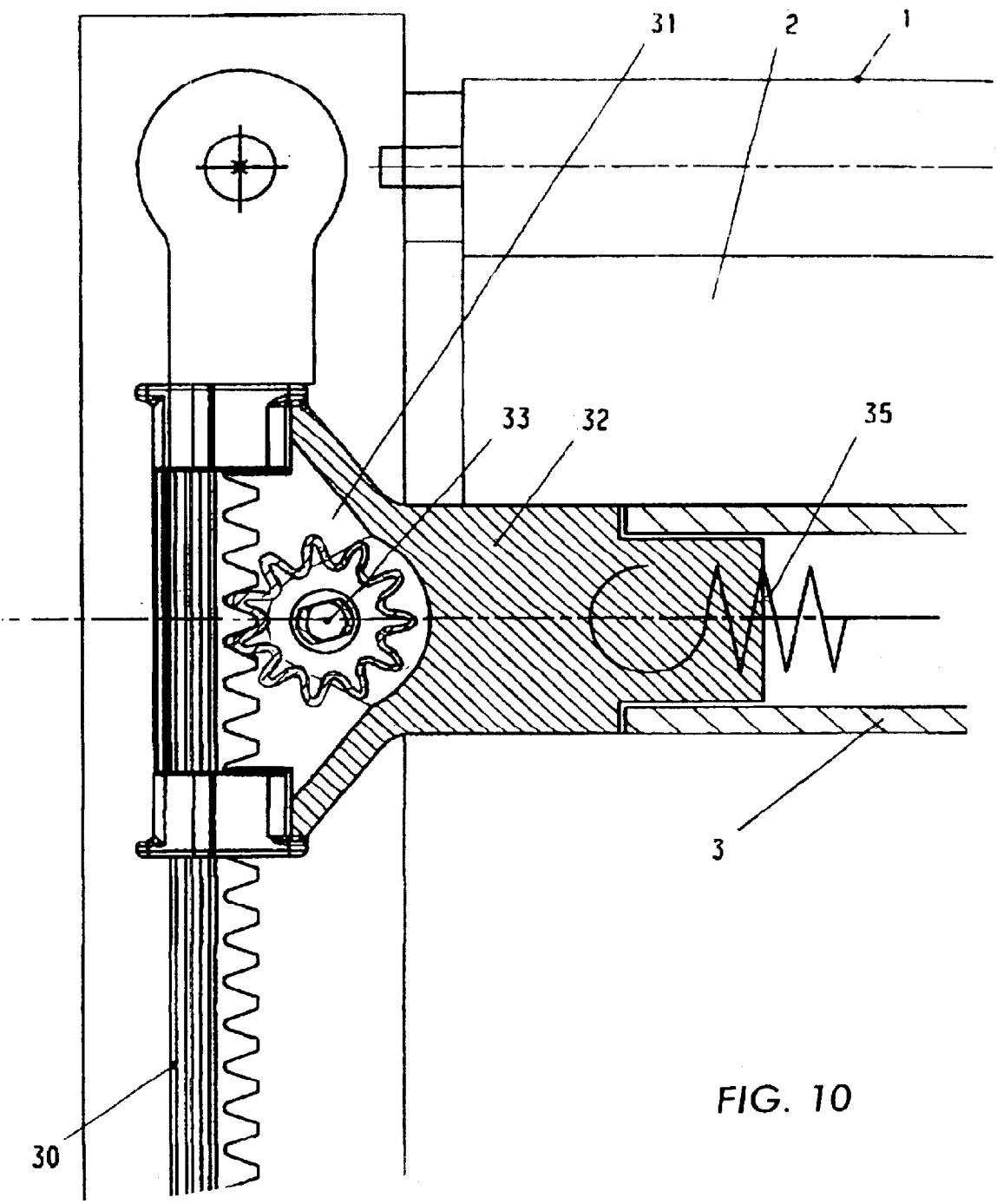
FIG. 10 shows a part region of the window blind according to FIG. 9 in vertical section.

FIG. 10 shows a section through one of the end regions of the pull bar 3. There is a bearing housing 32 which is inserted into this pull bar end for mounting a bearing shaft 33, a toothed wheel 31 and a shaped body 34. As can be seen, the toothed wheel 31 meshes with the toothing of the rack. This also occurs with the second toothed wheel 31 located at the other pull bar end and the associated toothing of the second rack 30, so that the pull bar 3 cannot tilt when the blind web 2 is drawn down from the winding shaft. Dimensional differences can be compensated by a spring 35 acting on one bearing housing 32.

Figure 11:
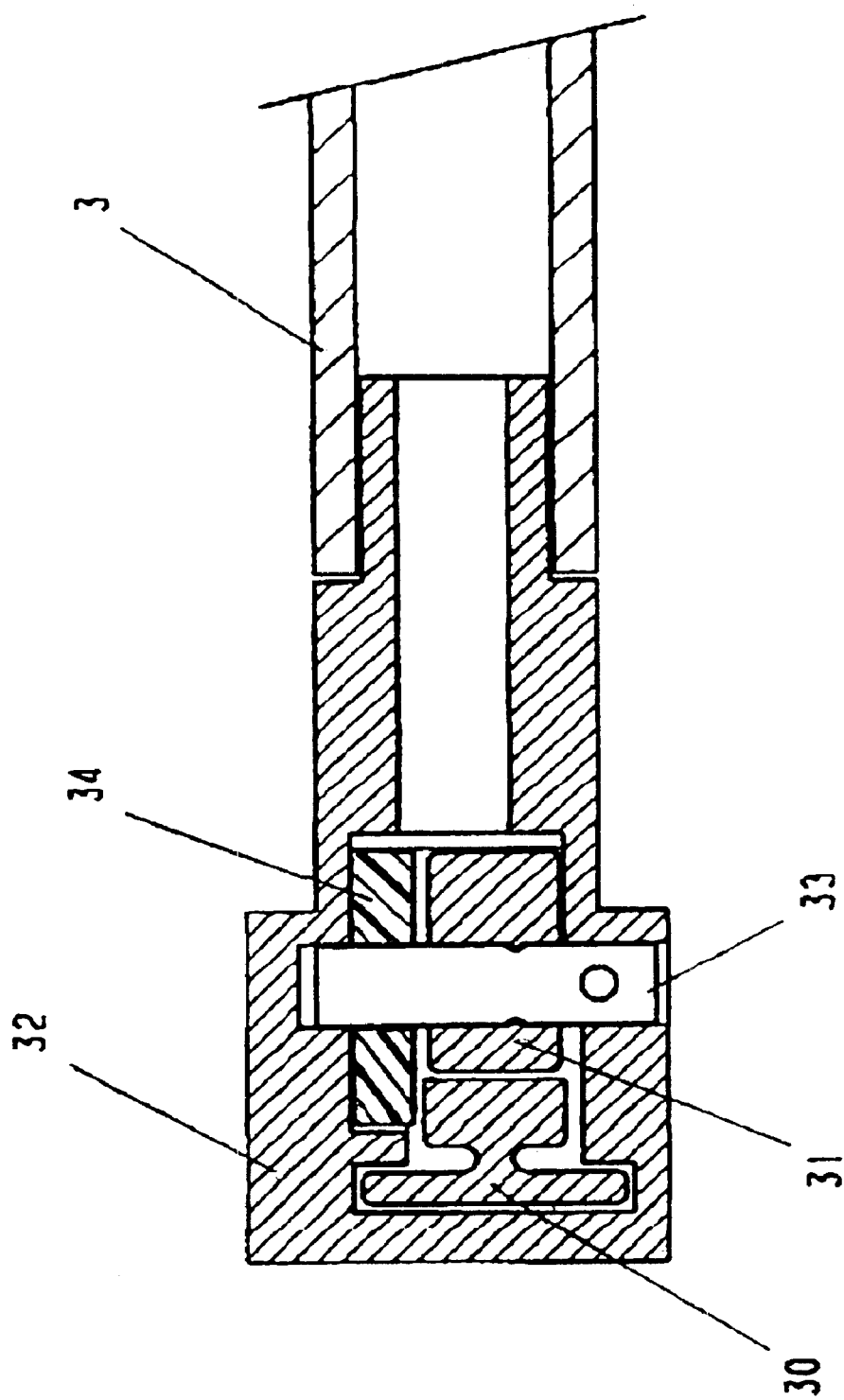
FIG. 11 shows a part region of the window blind according to FIG. 9 in horizontal section.

FIG. 11 shows that the bearing shaft 33 bears not only a toothed wheel 31 connected to it in a rotationally fixed manner but also the above-mentioned shaped body 34 which serves as a friction brake and consists of a wear-resistant, viscoplastic synthetic material, such as a thermoplastic polyester elastomer. The shaped body 34 has a bore for receiving an axial region of the bearing shaft 33, and the opening cross section of the bore is smaller than the cross section of the bearing shaft 33, so that the bearing shaft is located in the bore in the manner of a press fit. The press fit is nevertheless selected in such a manner that a relative movement between the shaped body 34 and the bearing shaft 33 is still possible, and locking of the blind is brought about by matching the spring force of the rolling-up device and the shaped bodies 34.

Figure 12:
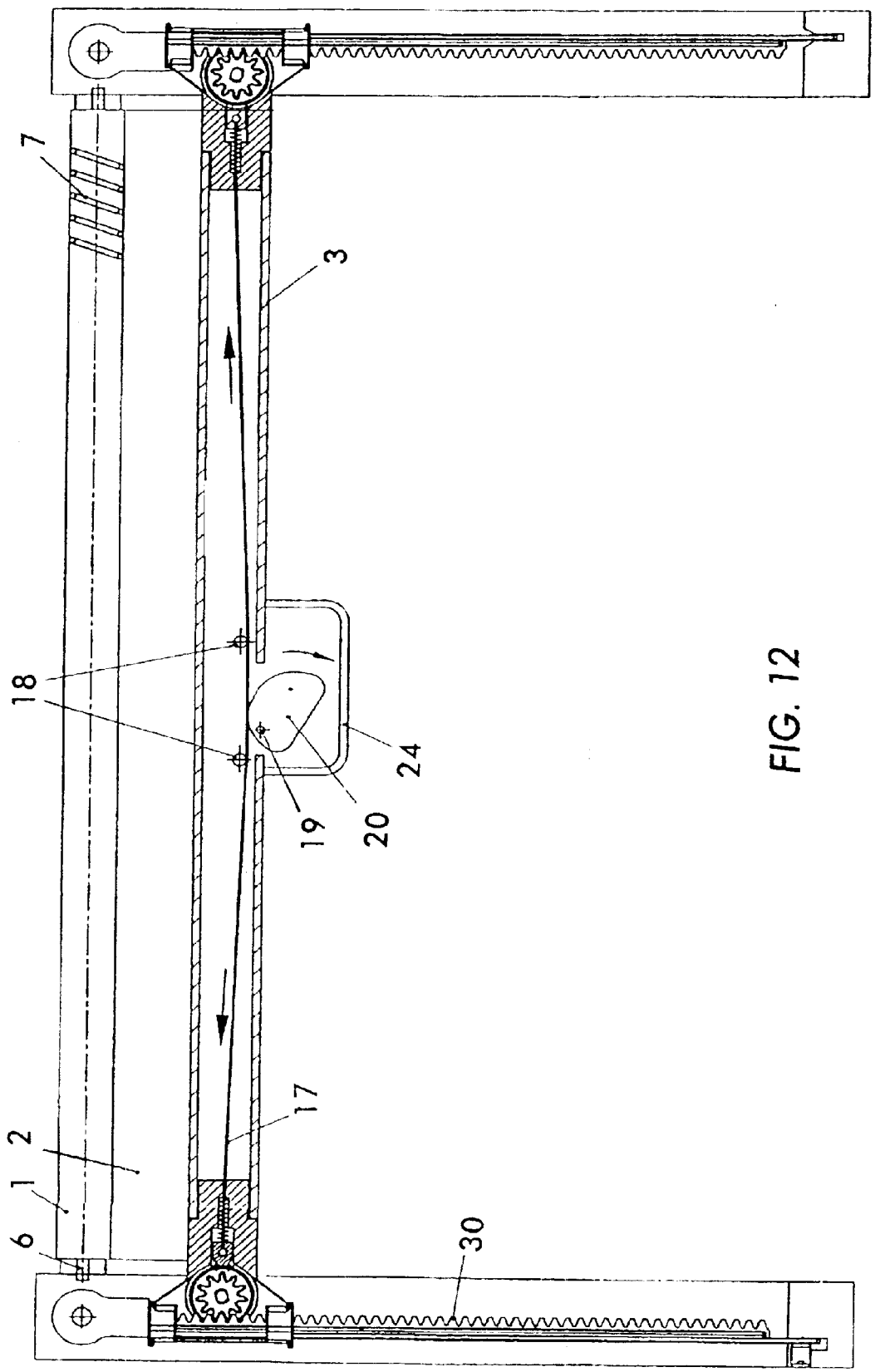
FIG. 12 shows a view of a third complete window blind.
Figure 13:
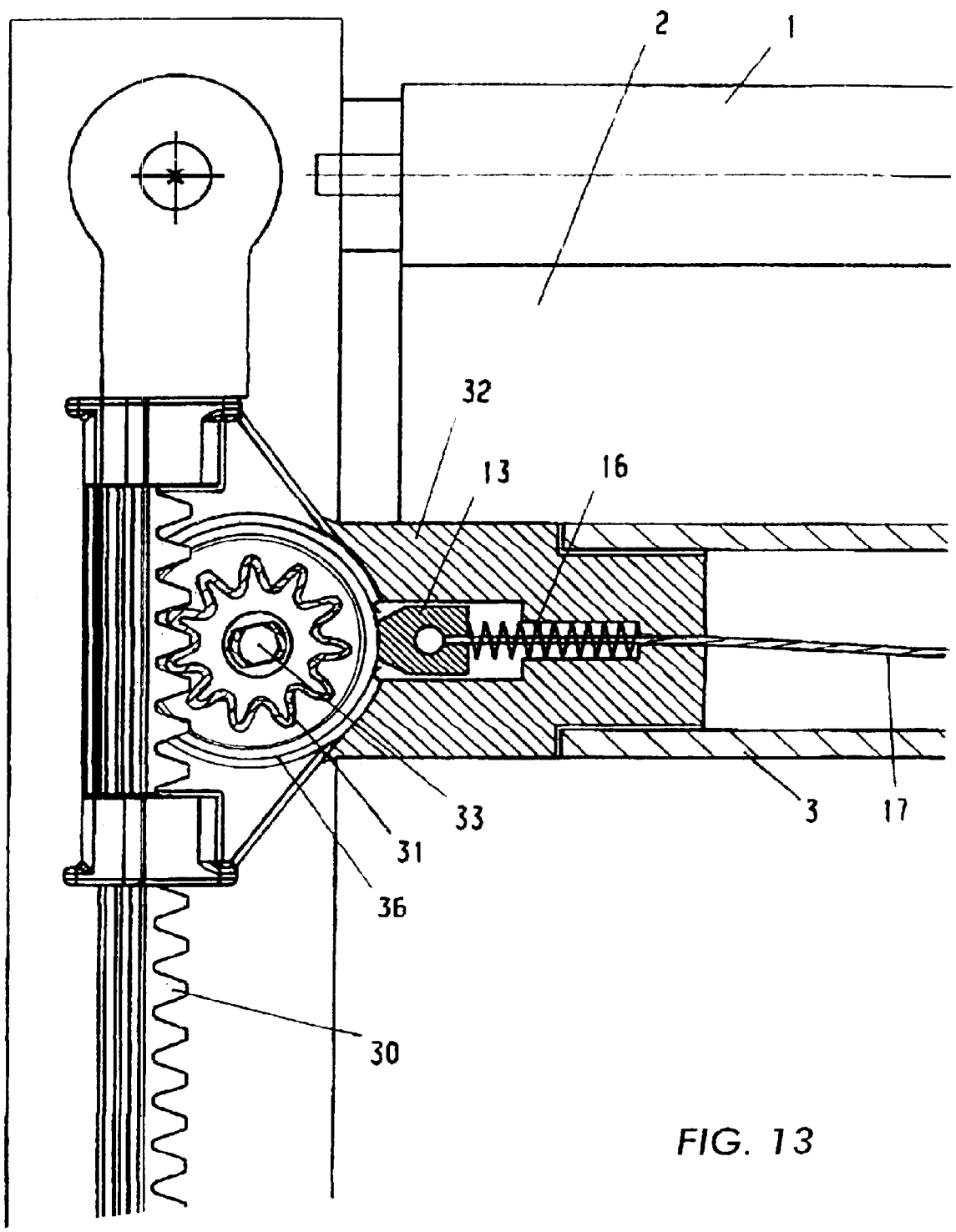
FIG. 13 shows a part region of the window blind according to FIG. 12 in vertical section.

The window blind according to FIGS. 12 and 13 has a similar construction to that according to FIGS. 1 to 8, so that the same reference numbers are once again to serve for corresponding parts here. Instead of the hollow profile strips 4 and closing element 5 provided in the window blind according to FIGS. 1 to 8, the window blind of FIGS. 12 and 13 has guide arrangements which, corresponding to the window blind according to FIGS. 9 to 11, comprise two racks 30 flanking the blind web 2 at its longitudinal edges and two toothed wheels 31 which mesh with the racks and are arranged in the end regions of the pull bar 3.

Inserted into the pull bar ends are bearing housings 32 which each serve for mounting a bearing shaft 33 and a toothed wheel 31 and each housing, as shown in FIG. 11, surround a rack 30. The toothed wheels 31 each have a toothed circumferential region which interacts with the respective rack 30 and moreover the wheels 31 have an untoothed circumferential region 36, which interacts with brake blocks 13. The design of the braking arrangement, the functioning of the brake and also the canceling of the braking action for adjusting the blind web 2 correspond exactly to the embodiment according to FIG. 2, described above.

Figure 14:
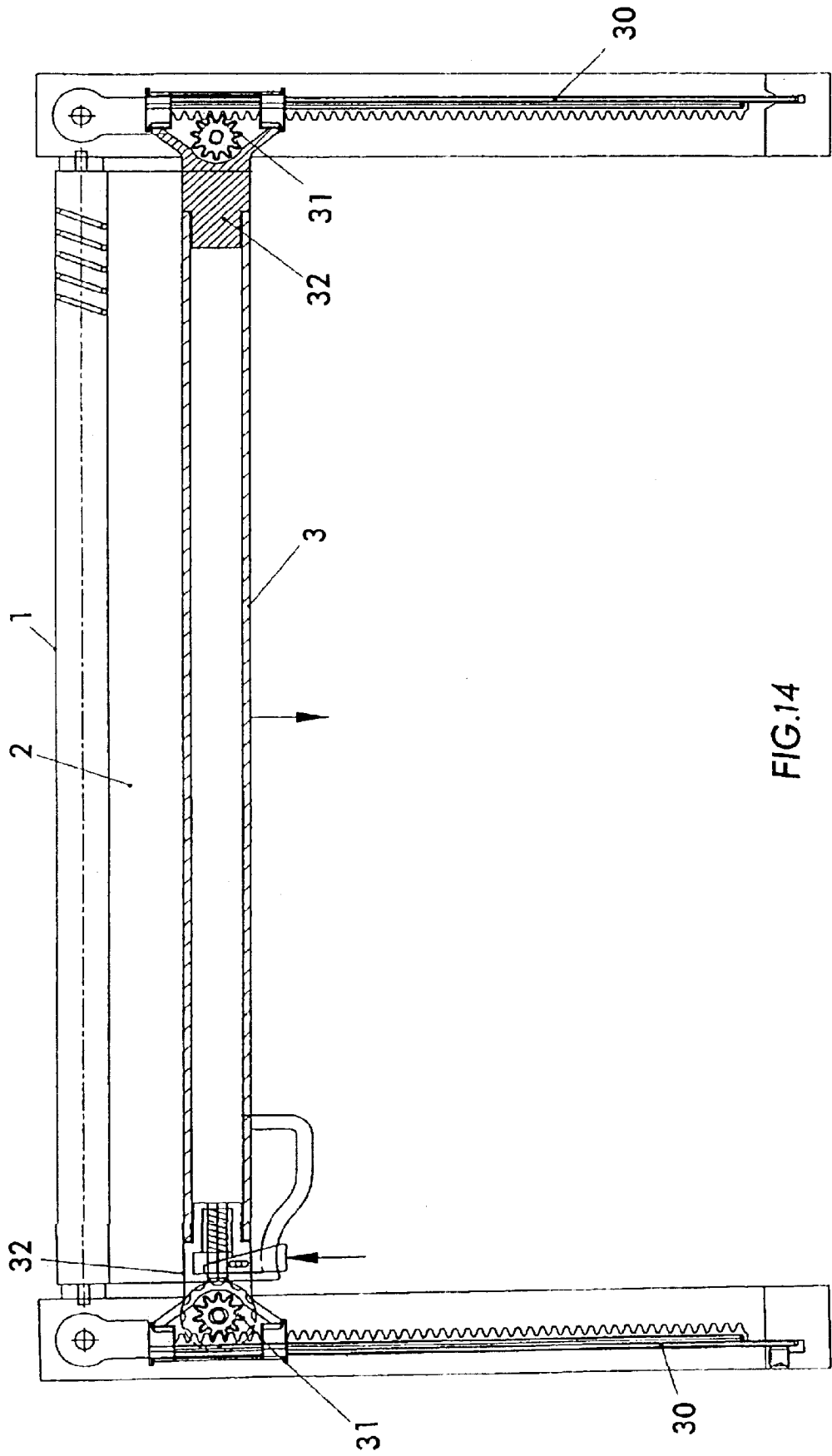
FIG. 14 shows a view of a fourth complete window blind.
Figure 15:
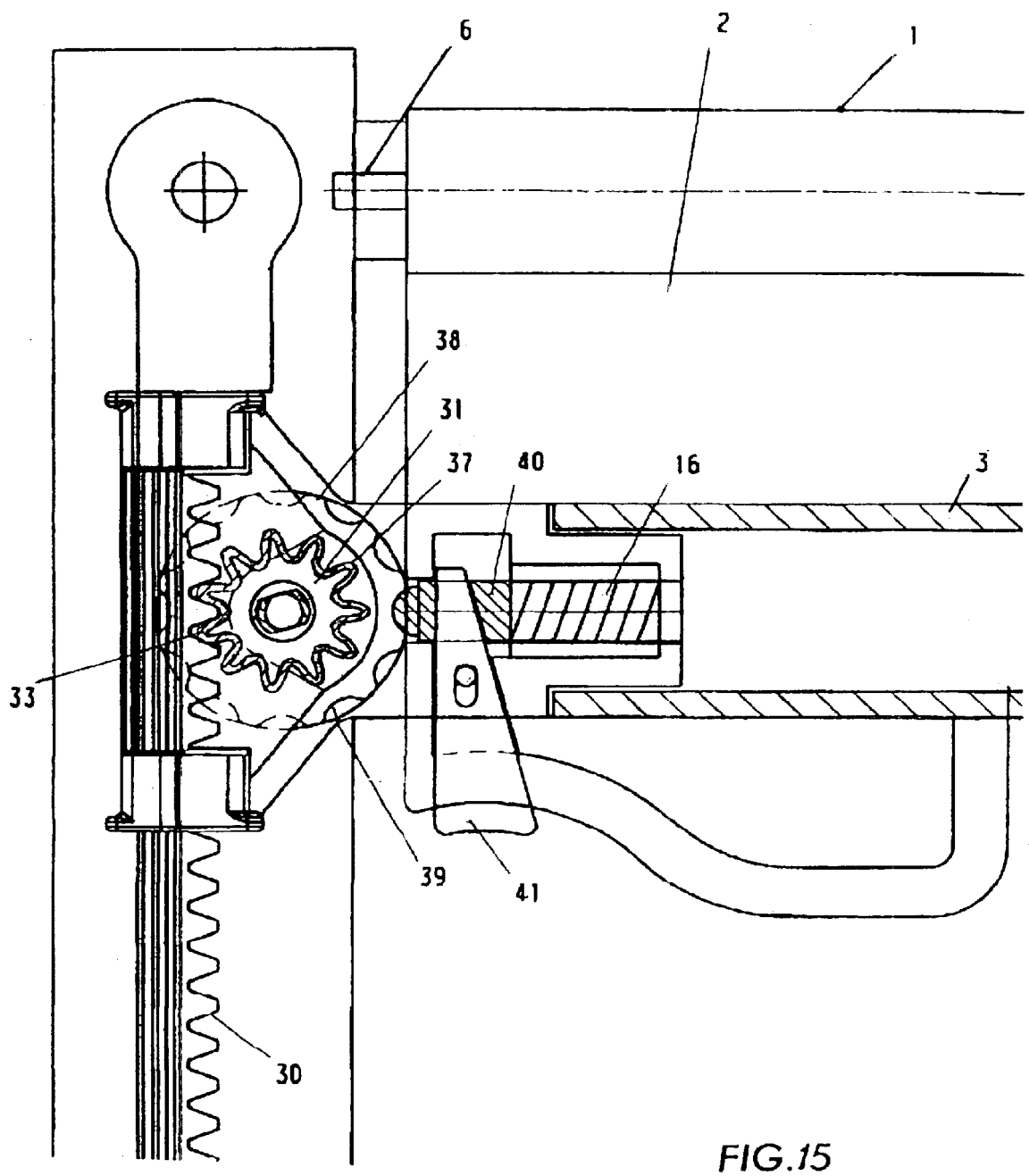
FIG. 15 shows a part region of the window blind according to FIG. 14 in vertical section.

In the window blind according to FIGS. 14 and 15, parts corresponding to the embodiments described have been provided with corresponding reference numbers. In FIGS. 14 and 15, at least one of the toothed wheels 31 is provided with an external toothing 38 in addition to the toothing 37 meshing with the rack 30. A braking body 40 under the influence of a compression spring 16 engages in the tooth space 39 of the toothed wheel 31. By means of a manually operable slide 41, the body 40 can be disengaged again counter to the force of the compression spring 16.

The invention is not limited to the illustrative embodiments shown, but also comprises all similarly operating embodiments in accordance with the invention. The invention is not limited to the specific combinations of features in each embodiment, but it can also be defined by any combinations of specific features from all the individual features disclosed, and any individual feature can be omitted or can be replaced by at least one individual feature disclosed at another place.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A window blind comprising:
   a winding shaft with a web rolling-up arrangement;
   a blind web which is rollable up on the winding shaft and rollable off the winding shaft; the blind web having longitudinal edges at opposite lateral sides thereof and having a free end off the shaft;
   a pull bar fastened to the free end of the blind web, the pull bar having end regions;
   a respective guide device for each of the end regions of the pull bar for guiding motion of the pull bar perpendicular to the axis of the pull bar for guiding rolling up and rolling off of the blind web on the rolling shaft;
   a braking arrangement for the pull bar, the braking arrangement being located on the pull bar and connected with the guide device and selectively operable for fixing the pull bar in any selected location along the guide device and for releasing the pull bar for movement along the guide device.

2. The window blind of claim 1, wherein the brake release device for the brake block comprises a taut guided cable fastened to the brake block, a support in the pull bar for the cable and an actuating device on the brake block operable for pulling the cable to move the brake block away from braking engagement with the profile strip.

3. The window blind of claim 1, wherein there is a respective one of the closing bodies and a respective one of the brake blocks at each opposite end of the pull bar and a respective compression spring engaging each brake block to urge it into braking engagement with the respective profile strip;
   the brake release device at the pull bar connected with each of the brake blocks to move the brake blocks off braking action with the profile strips by operation of the brake release device.

4. The window blind of claim 3, wherein the brake release device comprises a taut guided cable fastened to the brake blocks at each end of the pull bar; the brake release device being operable for shortening the active length of the cable to draw the brake blocks toward one another and release the braking action.

5. The window blind of claim 4, wherein the brake release device comprises a manually operable lever moveably supported on the pull bar and including a working surface having an eccentric path thereon which is in engagement with the cable and is operable by movement of the lever to move the eccentric path along the cable and change the active length of the cable for moving the brake blocks.

6. The window blind of claim 3, further comprising supports spaced from one another on the pull bar and past which the cable passes and by which the cable is supported;
   the brake release device being operable on the cable between the supports and operable for selectively shortening the active length of the cable for drawing the brake blocks toward one another.

7. The window blind of claim 6, wherein the brake release device comprises a manually operable lever moveably supported on the pull bar and including a working surface having an eccentric path thereon which is in engagement with the cable and operable by movement of the lever to move the eccentric path along the cable and change the active length of the cable for moving the brake blocks.

8. The window blind of claim 5, further a comprising a handle on the pull bar by which the pull bar is pulled, the handle having an opening therein and the brake release device lever being positioned in the handle opening so that the brake release lever may be contacted when the handle is grasped.

9. The window blind of claim 1, wherein the guide arrangement comprises two racks flanking the longitudinal edges at the lateral sides of the blind web; and
   a respective toothed wheel which meshes each of the racks and is arranged at the end regions of the pull bar.

10. The window blind of claim 9, wherein the braking arrangement is connected with one of the toothed wheels for braking the toothed wheel.

11. The window blind of claim 9, further comprising a bearing shaft for the toothed wheel and on which the toothed wheel is rotatable, the braking arrangement acting on the bearing shaft for braking the bearing shaft to brake the toothed wheel.

12. The window blind of claim 9, further comprising a respective bearing housing at each end region of the pull bar and surrounding a portion of the rack then at the pull bar, a bearing shaft supported by the bearing housing and the toothed wheel being supported for rotation on the bearing path;
   the braking arrangement comprising a friction brake arranged in the bearing housing in a rotationally fixed manner in relation to the bearing shaft and operable for braking the movement of the pull bar.

13. The window blind of claim 12, wherein the friction brake comprises a shaped body of a wear resistant, visco plastic synthetic material in the bearing housing and supported on the bearing shaft in a manner which restricts the rotation of the friction brake on the shaft but which permits relative movement between the shaped body of the brake and the bearing shaft.

14. The window blind of claim 9, wherein the toothed wheels have a toothed region around a circumference thereof and have untoothed circumferential region away from the toothed region; each brake block being loaded by the respective compression spring against the untoothed circumferential region of the respective wheel; the brake release device being between the braking blocks and at each bearing housing operable for moving the brake blocks toward one another counter to the forces of the respective compression spring for canceling the braking action.

15. The brake block of claim 14, wherein the brake release device comprises a taut guided cable fastened to the brake blocks, and the brake release device acts on the cable for shortening the length of the cable to draw the brake blocks towards each other.

16. The window blind of claim 9, wherein there is a respective one of the closing bodies and a respective one of the brake blocks at each opposite end of the pull bar and a respective compression spring engaging each brake block to urge it into braking engagement with the respective profile strip;

the brake release device at the pull bar being connected with each of the brake blocks to move the brake blocks off the braking action with the profile strips by operation of the brake release device.

17. The brake block of claim 16, wherein the brake release device comprises a taut guided cable fastened to the brake blocks at each end of the pull bar; the actuating device being operable for shortening the active length of the cable to draw the brake blocks toward one another and release the braking action.

18. The window blind of claim 17, wherein the brake release device comprises a manually operable lever moveably supported on the pull bar and including a working surface having an eccentric path thereon which is in engagement with the cable and is operable by movement of the lever to move the eccentric path along the cable and change the active length of the cable for moving the brake blocks.

19. The window blind of claim 18, further a comprising a handle on the pull bar by which the pull bar is pulled, the handle having an opening therein and the actuating device lever being positioned in the opening so that the brake release lever may be contacted when the handle is grasped.

20. The window blind of claim 8, further comprising: at least one toothed wheel comprising an external toothing thereon spaced from the toothing meshing with a rack; the braking arrangement comprising a braking body and a compression spring for urging the braking body against the external toothing for braking the toothed wheel; a manually operable slide for operating against the action of the compression spring for disengaging the braking body from the external toothing.

21. The window blind of claim 12, further comprising a compression spring for urging at least one of the bearing housings outwardly in the direction of the respective rack.

* * * * *

UNITED STATES PATENT AND TRADEMARK OFFICE
CERTIFICATE OF CORRECTION

PATENT NO. : 6,748,999 B2
DATED : June 15, 2004
INVENTOR(S) : Vincent Churchfield It is certified that error appears in the above-identified patent and that said Letters Patent is hereby corrected as shown below:

Title page,
Item [73], Assignee, should read -- Happich Fahrzeug-und Industrieteile GmbH (DE) --

Signed and Sealed this

Twenty-eighth Day of September, 2004

JON W. DUDAS
*Director of the United States Patent and Trademark Office*